United States Patent
Humer et al.

(10) Patent No.: US 8,100,472 B2
(45) Date of Patent: Jan. 24, 2012

(54) VEHICLE ACTIVE HEAD RESTRAINT SYSTEM WITH A LOCKING LINKAGE

(75) Inventors: Mladen Humer, West Bloomfield, MI (US); Arjun Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 982 days.

(21) Appl. No.: 12/049,589

(22) Filed: Mar. 17, 2008

(65) Prior Publication Data

US 2009/0234544 A1  Sep. 17, 2009

(51) Int. Cl.
*B60N 2/42* (2006.01)
(52) U.S. Cl. .................................. 297/216.12
(58) Field of Classification Search ............... 297/216.12
See application file for complete search history.

(56) References Cited

U.S. PATENT DOCUMENTS

| | | | |
|---|---|---|---|
| 4,674,797 A | 6/1987 | Tateyama | |
| 5,020,855 A * | 6/1991 | Lindberg et al. | 297/391 |
| 5,664,841 A * | 9/1997 | Dal Monte | 297/408 |
| 5,882,060 A | 3/1999 | Walk et al. | |
| 6,082,817 A | 7/2000 | Müller | |
| 6,550,856 B1 | 4/2003 | Ganser et al. | |
| 6,688,697 B2 | 2/2004 | Baumann et al. | |
| 6,715,829 B2 | 4/2004 | Svantesson et al. | |
| 6,802,562 B1 | 10/2004 | Hake et al. | |
| 6,805,411 B2 | 10/2004 | Gramss et al. | |
| 6,957,858 B2 * | 10/2005 | Yetukuri et al. | 297/216.12 |
| 6,983,989 B1 | 1/2006 | Veine et al. | |
| 7,008,019 B2 | 3/2006 | Lampke et al. | |
| 7,048,336 B2 | 5/2006 | Mawbey et al. | |
| 7,070,235 B2 | 7/2006 | Schilling et al. | |
| 7,073,856 B2 | 7/2006 | Akaike et al. | |
| 7,111,901 B2 | 9/2006 | Schlierf et al. | |
| 7,195,313 B2 | 3/2007 | Hippel et al. | |
| 7,344,191 B2 | 3/2008 | Schilling et al. | |
| 7,484,797 B2 | 2/2009 | Akaike et al. | |
| 2001/0040396 A1 | 11/2001 | Kreuels et al. | |
| 2005/0077762 A1 | 4/2005 | Kraemer et al. | |
| 2005/0116515 A1 | 6/2005 | Schlierf et al. | |
| 2005/0168020 A1 | 8/2005 | Yetukuri et al. | |
| 2006/0071518 A1 | 4/2006 | Hippel et al. | |

(Continued)

FOREIGN PATENT DOCUMENTS

DE  3042802 A1  6/1982

(Continued)

OTHER PUBLICATIONS

Final Office Action mailed Nov. 12, 2010 in U.S. Appl. No. 11/766,439, filed Jun. 21, 2007, 31 pgs.

(Continued)

*Primary Examiner* — Sarah B McPartlin
(74) *Attorney, Agent, or Firm* — Brooks Kushman PC

(57) ABSTRACT

A vehicle seat is provided with a frame providing structure for a seat back within a vehicle. An active head restraint system is supported by the frame for moving to an extended position when the active head restraint system is activated. The active head restraint system has a linkage to lock in the extended position. A head restraint is oriented above the seat back of the frame. The head restraint is moveable relative to the frame by the active head restraint system to the extended position to provide support to the head of the occupant during an impact condition.

19 Claims, 4 Drawing Sheets

U.S. PATENT DOCUMENTS

| | | | |
|---|---|---|---|
| 2006/0226688 A1 | 10/2006 | Terada et al. | |
| 2006/0279114 A1* | 12/2006 | Toda et al. | 297/216.12 |
| 2007/0085400 A1* | 4/2007 | Terada et al. | 297/391 |
| 2007/0241593 A1 | 10/2007 | Woerner | |
| 2007/0246989 A1 | 10/2007 | Brockman | |
| 2008/0252113 A1 | 10/2008 | Alexander et al. | |

FOREIGN PATENT DOCUMENTS

| | | |
|---|---|---|
| DE | 102006035352 A1 | 4/2007 |
| EP | 1724148 A1 | 11/2006 |
| WO | 87/03256 A1 | 6/1987 |
| WO | 2008014850 A2 | 2/2008 |
| WO | 2008095636 A1 | 8/2008 |

OTHER PUBLICATIONS

Final Office Action mailed Apr. 29, 2010 in U.S. Appl. No. 11/766,439, filed Jun. 21, 2007, 24 pgs.

Office Action mailed Dec. 3, 2009 in U.S. Appl. No. 11/766,439, filed Jun. 21, 2007, 22 pgs.

Final Office Action mailed Aug. 21, 2009 in U.S. Appl. No. 11/766,439, filed Jun. 21, 2007, 21 pgs.

Office Action mailed Feb. 17, 2009 in U.S. Appl. No. 11/766,439, filed Jun. 21, 2007, 29 pgs.

* cited by examiner

VEHICLE ACTIVE HEAD RESTRAINT SYSTEM WITH A LOCKING LINKAGE

BACKGROUND OF THE INVENTION

1. Field of the Invention

The invention relates to vehicle active head restraint systems.

2. Background Art

Vehicle seats are provided with moveable head restraints for moving to an impact position in response to a signal or force imparted to the seat before or during an impact condition. One example of a vehicle seat having a movable head restraint is disclosed in U.S. Pat. No. 6,983,989 B1, which issued on Jan. 10, 2006.

BRIEF DESCRIPTION OF THE DRAWINGS

FIG. 6b is a side elevation view of the locking linkage of FIG. 6a;

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
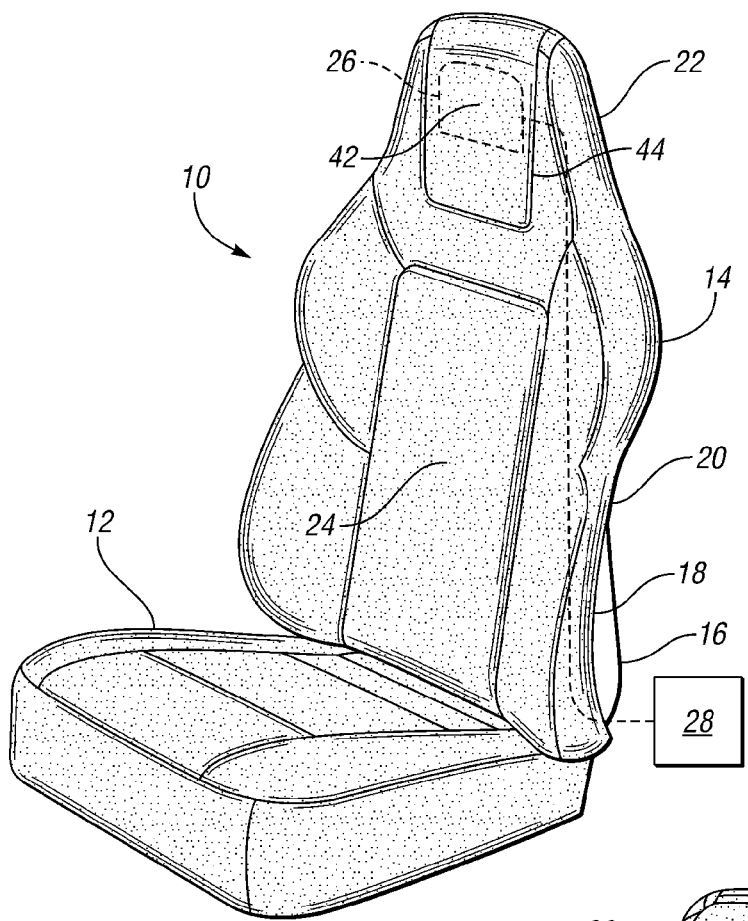
FIG. 1 is a perspective view of an embodiment of a vehicle seat illustrated in a design position.

Referring to FIG. 1, a vehicle seat is illustrated and referenced generally by numeral 10. The vehicle seat includes a seat bottom 12 secured to a floor of an associated vehicle for seating an occupant upon the seat bottom 12. A seat back 14 extends from the seat bottom 12 and is secured relative to the seat bottom 12 for supporting a back of the occupant against the seat back 14. The seat back 14 may pivot relative to the seat bottom 12 to permit ingress and egress to and from a rear seating row and/or to permit an occupant to select a comfortable riding position while sitting in the vehicle seat 10.

In one embodiment, the seat back 14 includes a frame 16 for providing structural support for the seat back 14. Cushioning 18 is mounted on the frame 16 to support the occupant. The cushioning 18 may include foam, padding, bolsters and/or support wires. A cover 20 rests over the cushioning 18 to conceal the cushioning 18. Any suitable cushioning 18 and cover 20 such as those known in the art may be mounted on the frame 16.

As illustrated, the frame 16 of the seat back 14 is an integrated frame 16 so that the frame 16 collectively includes a head restraint frame portion 22 and a back support frame portion 24 integrated into the frame 16. An integrated frame 16 is commonly used in sports vehicles. With the increase in popularity of sport vehicles, integrated frames 16 also have increased popularity. When covered by the cushioning 18, the head restraint frame portion 22 supports a head of the occupant and has limited height adjustment relative to the back support portion 24. Although the seat back 14 is illustrated with an integrated frame 16, any suitable frame 16 is contemplated within the scope of the present invention. For example, the frame 16 may include only the back support frame portion 24 and a separate head restraint frame 22 that is mounted within the back support frame portion 24 with rods or otherwise, as is known in the art. In another example, the frame 16 is integrated with a frame of the vehicle. In still another example, the frame 16 includes only the back support frame portion 24, while a separate head restraint 22 is mounted on the frame of the vehicle.

In one embodiment, the back support frame portion 24, when covered by the cushioning 18 as illustrated, supports the back of the occupant and is an integral portion of the frame 16. The head restraint frame portion 22 and the back support frame portion 24 are contoured to be generally flush so that neither the head restraint frame portion 22 nor the back support frame portion 24 covered by cushioning 18 extend farther than the other. The back support frame portion 24 is designed to comfortably support the back of the occupant by providing a generally flat surface, which is flush with the head restraint frame portion 22 and curved portions on either side of the flat surface. Any suitable design for the back support frame portion 24 is contemplated within the scope of the present invention.

In the depicted embodiment, the head restraint frame portion 22 supports a head restraint 42. The head restraint 42 need not be directly mounted to the head restraint frame portion 22 and may be mounted indirectly to the head restraint frame portion 22 in any suitable manner or mounted directly to the vehicle. The head restraint 42 may be located in a residing area 44 provided in the head restraint frame portion 22. The head restraint 42 is moveable between two positions and is made of a foam material or any suitable material known in the art. Of course, the motion of the head restraint 42 may be linear or nonlinear movement. FIG. 1 illustrates a design position for normal driving conditions. The head restraint 42 is moveable to an extended position by an active head restraint system 26 for minimizing potential for injury of an occupant. The extended position may be any position with any movement of the head restraint 42 when compared to the design position. The head restraint 42 when covered by cushioning 18 forms a part of a surface of the head restraint frame portion 22 and is surrounded by the remaining head restraint frame portion 22.

Multiple embodiments of the present invention incorporate the moveable head restraint 42 supported by the head restraint frame portion 22 and the active head restraint system 26 into the integrated frame 16 to make active head restraint systems 26 in integrated frames 16 available when desired.

Additionally, when typical prior art active head restraint systems extend a head restraint to a head of an occupant during an impact condition, the active head restraint system retracts back towards the design position because a locking mechanism is not provided to lock the active head restraint system in the extended position. If a locking mechanism is provided, an additional component is typically employed within the active head restraint system, which adds additional weight to the system and employs additional amounts of space. The active head restraint system 26 of the multiple embodiments of the present invention provide a compact and efficient locking linkage 27 to lock the active head restraint system 26 in the extended position or any desired position between the design position and the extended position. The locking linkage 27 is discussed more specially below with reference to FIGS. 6a-8b.

Figure 2:
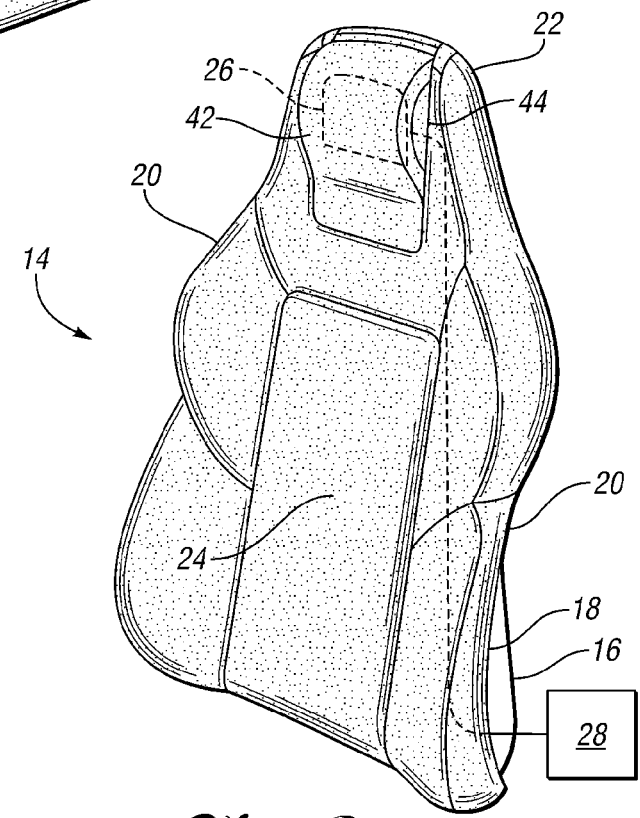
FIG. 2 is a perspective view of a seat back of the vehicle seat of FIG. 1 illustrated with a head restraint in an extended position.

Referring now to FIG. 2, the seat back 14 of FIG. 1 is illustrated with the head restraint 42 moved to the extended position from the design position of FIG. 1. The active head restraint system 26 moves the head restraint 42 from the design position, as in FIG. 1, to the extended position depicted. The active head restraint system 26 helps to minimize whiplash injury to an occupant by extending the head restraint 42 toward the head of the occupant. A whiplash injury occurs when the occupant's head is over-extended during an impact condition. When the vehicle is impacted by another object, the seat 10 is accelerated into the occupant, and the back of the occupant moves a distance into the seat back frame portion 24. Accordingly, the head restraint 42 is moved toward the head of the occupant to support the occupant's head to minimize potential for injury to the occupant. An example of an active head restraint system with a mechanical input is discussed in U.S. patent application Ser. No. 11/766,439 filed by Yetukuri et al. on Jun. 21, 2007, which is hereby incorporated in its entirety by reference herein.

The active head restraint system 26 locks when deployed to the extended position shown in FIG. 2. When the head restraint 42 is locked in the extended position, support of the head of the occupant is further facilitated. As the head of the occupant pushes into the head restraint 42 during an impact condition, the head restraint 42 may tend to retract towards the design position. By locking the active head restraint system 26, the head restraint 42 is prevented from retracting towards the design position when the head of the occupant contacts the head restraint 42 during an impact condition.

In FIG. 2, the active head restraint system 26 is in the extended position. The head restraint 42 is mounted directly onto the frame 16 and is covered by the cushioning 18 and the cover 20 so that the assembled seat back 14 has a contour in the extended position, which is not separate from the head restraint frame portion 22. The active head restraint system 26 has actuated the head restraint 42 from head restraint frame portion 22 to the extended position.

In one embodiment, the active head restraint system 26 is connected to a controller 28, which provides an input signal to the active head restraint system 26 to actuate the head restraint 42 to the deployed position. In another embodiment, the controller includes a limit switch 28. The limit switch 28 responds to a mechanical input provided by an input force received from the occupant, which exceeds a predetermined force. The limit switch 28 may be any suitable limit switch 28 known in the art. When the limit switch 28 is actuated, the limit switch 28 sends a signal to the active head restraint system 26.

In another embodiment, the controller 28 sends an electrical signal to the active head restraint system 26 when a predetermined event actuates the controller 28. A non-limiting example of the predetermined event is when the seat back 14 receives a force of the occupant against the seat back 14. In another example, the predetermined event is an impact on the front or rear bumper of the vehicle, which is detected by sensors. Any suitable manner of determining a predetermined event has occurred, and then sending a signal from the controller 28 to the active head restraint system 26, such as those known in the art, is contemplated within the scope of the present invention.

The controller 28 is activated, for example, when the vehicle is impacted by another object thereby accelerating the seat back 14 into the occupant and creating an impact condition. The impact condition may be generated from a rear impact. Likewise, the impact condition may be generated from a forward impact wherein the occupant rebounds from a seat harness or other mechanism, into the seat. If the force of the occupant exceeds a predetermined force, then the controller 28 sends a signal to the active head restraint system 26 to actuate the system. In another embodiment, the activation of the controller 28 is generated when an oncoming vehicle exceeds a predetermined acceleration before the impact condition occurs or when an algorithmic approach determines an impending crash.

In another embodiment, the controller 28 is activated by an output of a sensor provided in the vicinity of a bumper of the vehicle such that the sensor detects an impending impact and then activates the controller 28. Any suitable sensor such as those known in the art may be employed. In yet another embodiment, the controller 28 is activated by an output of a limit switch, which detects a possible external impact. Any suitable limit switch such as those known in the art is contemplated within the scope of the present invention. In still another embodiment, the controller 28 is activated by an output of an inertia switch such that a specified change in momentum of the vehicle causes the inertia switch to activate the controller 28.

Upon activation of the controller 28, the controller 28 signals the active head restraint system 26 to deploy the head restraint frame portion 22 from the design position, illustrated in FIG. 1, to the extended position, illustrated in FIG. 2. In the extended position, the head restraint 42 is oriented closer to the head of the occupant than in the design position and the head restraint 42 is locked in the extended position.

After the head restraint 42 is locked in the extended position, the active head restraint system 26 can be manually returned to the design position in any suitable manner. In another embodiment, the active head restraint system 26 automatically allows the head restraint 42 to return to the design position after actuation to the extended position. In yet another embodiment, after the head restraint 42 is in the extended position, the controller 28 sends a signal to the active head restraint system 26 to return the head restraint 42 to the design position. In still another embodiment, the active head restraint system 26, in the extended position, must be manually returned to the design position. Of course, any suitable manner of returning the head restraint 42 from the locked extended position to the design position is contemplated within the scope of the present invention.

Figure 3:
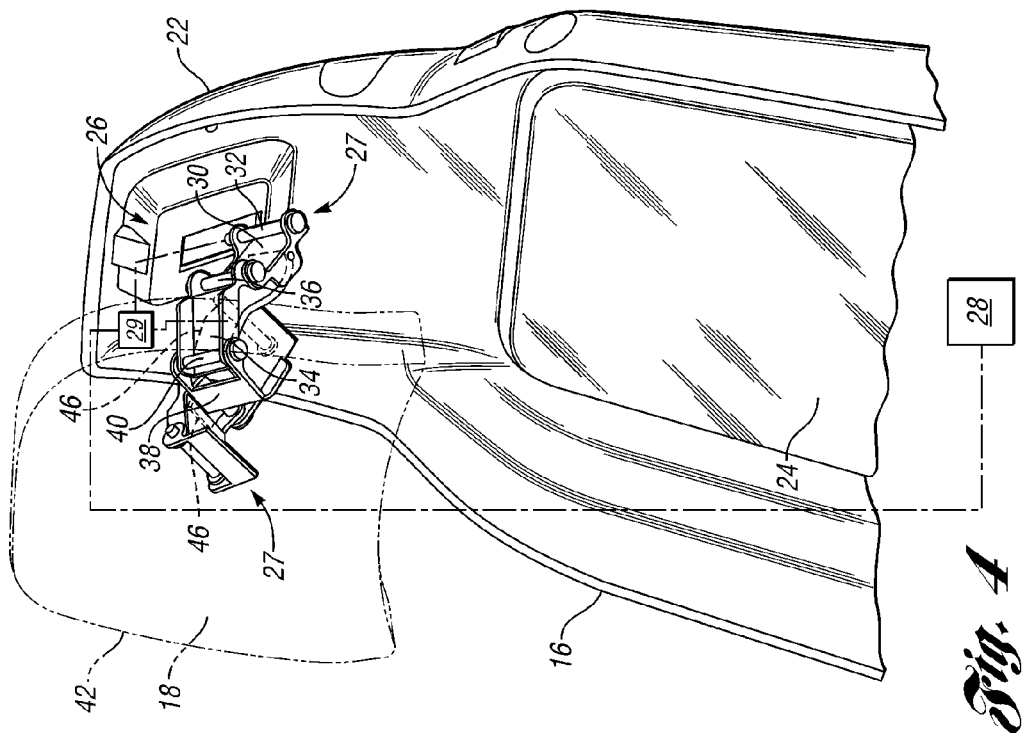
FIG. 3 is a perspective view of a portion of another embodiment of a seat back of a vehicle seat in a design position.
Figure 4:
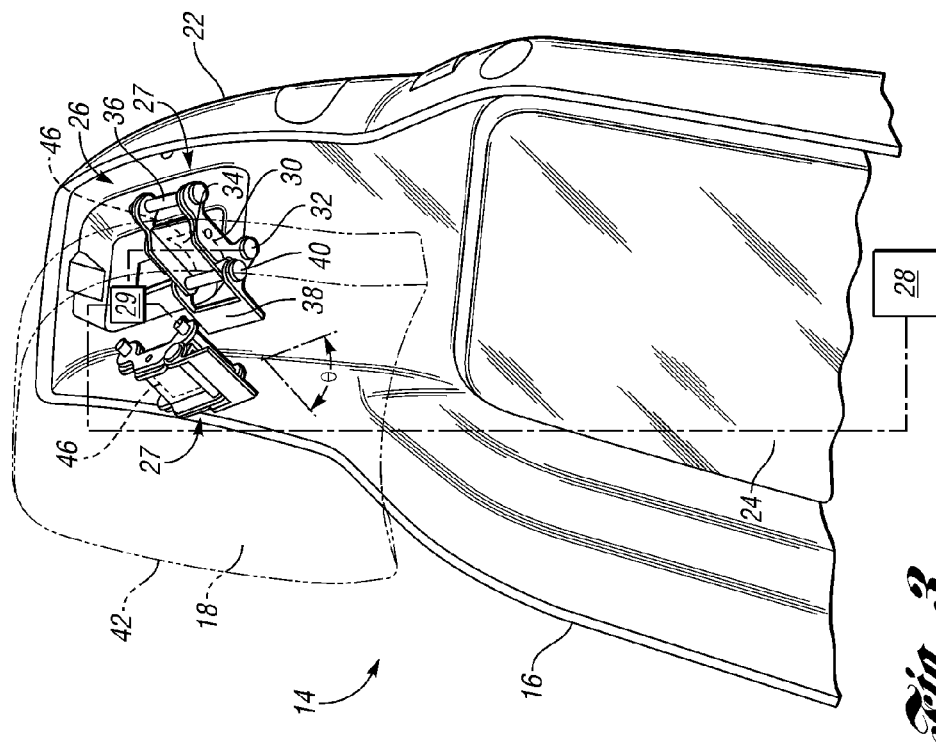
FIG. 4 is a perspective view of the seat back of FIG. 3 with a head restraint in an extended position.

With reference to FIGS. 3 and 4, a portion of a seat back 14 is illustrated with a cover and a portion of cushioning 18 removed. The seat back 14 has a frame 16 for providing the structural support for the entire seat back 14. A head restraint frame portion 22 extends from a back support frame portion 24 of the frame 16. The head restraint frame portion 22 supports an active head restraint system 26, which moves the cushioning 18 to accommodate a head of an occupant. The active head restraint system 26 moves the head restraint 42 to move from a design position, illustrated in FIG. 3 to an extended position, illustrated in FIG. 4.

The active head restraint system 26 includes a locking linkage 27 for moving the head restraint 42 to the extended position and locking the head restraint 42. In at least one embodiment, the locking linkage 27 includes a first link 30 pivotally mounted to the first frame 16. The first link 30 is pivotally mounted to a second link 34, at an end of the first link 30 that is opposite to the pivotal mounting to the frame 16. The second link 34 can be mounted to the head restraint 42 at an end opposite the pivotal mounting to the first link 30. In one embodiment, the second link 34 is mounted to the head restraint 42 by a fastener. Any suitable pivotal mounting of the second link 34 to the head restraint is contemplated within the scope of the present invention.

As depicted in FIGS. 3 and 4, the first and second locking linkages 27 include a pair of first links 30, second links 34, brackets 38, and locking member 46 to provide stabilized and uniform motion so that the head restraint 42 and brackets 38 maintain radial orientation relative to the frame 16 while moving linearly away from the frame 16. Any quantity of first links 30, second links 34, brackets 38, and locking member 46 is contemplated within the scope of the present invention.

As illustrated in FIG. 3, first and second linkages 27 are mounted between the frame 16 and the head restraint 42. The first and second linkages 27 are mounted at an angle to each other having an angle $\Theta$, where $\Theta$ may be the angle between the center-line of the first and second linkages 27. For stability, the angle $\Theta$ may be a non-zero angle, or in other words, the angle $\Theta$ may be where the centerlines of the first and second linkages 27 are non-parallel. In one embodiment angle $\Theta$ is approximately equal to ninety degrees to maximize stability the head restraint 42 in the extended position, or in other words, the first and second linkages 27 are mounted so that centerlines of the first and second linkages are perpendicular to each other, as illustrated in FIG. 4.

The active head restraint system 26, including the first links 30, the second links 34, and the brackets 38, is compact when oriented in the design position of FIG. 3 so that the head restraint 42 may be generally flush with the head restraint portion 22. The head restraint 42 need not be flush with the head restraint portion 22 when in the design position. When in the extended position of FIG. 4, the active head restraint system 26 moves the head restraint 42 a specified distance to support the head of the occupant. When the active head restraint system 26 is in the extended position, the first link 30, the second link 34, the bracket 38, and the locking member 46 are relatively stable so that the head restraint frame portion 22 does not move in unintended directions.

In the illustrated embodiment, the active head restraint system 26 is actuated by an actuator 29. When the controller 28 is activated, the controller 28 sends an input signal to the actuator 29. Upon receipt of the input signal by the actuator 29, the actuator 29 drives the active head restraint system 26 to the extended position, illustrated in FIG. 4. The actuator 29 may be a linear solenoid 29, which is connected to the controller 28 at an input end to receive a signal from the controller 28 and to the active head restraint system 26 at an output end to actuate the active head restraint system 26. Any known linear solenoid 29 is contemplated within the scope of the present invention. In another embodiment, the actuator 29 is a rotary solenoid 29, which is connected to the controller 28 at an input end and to the active head restraint system 26 at an output end. Any known rotary solenoid 29 is contemplated within the scope of the present invention. In yet another embodiment, the actuator 29 is a spring and a latch release 29 such that activation of the latch release 29 permits the spring move the active head restraint system 26. In still another embodiment, the actuator 29 is an actuation system 29 including a spring and a latch release in combination with a solenoid. When the actuation system 29 is deployed, the solenoid releases the latch to allow the spring to move the head restraint 42. Any suitable actuator 29, which can actuate the active head restraint system 26, is contemplated within the scope of the present invention.

Figure 5:
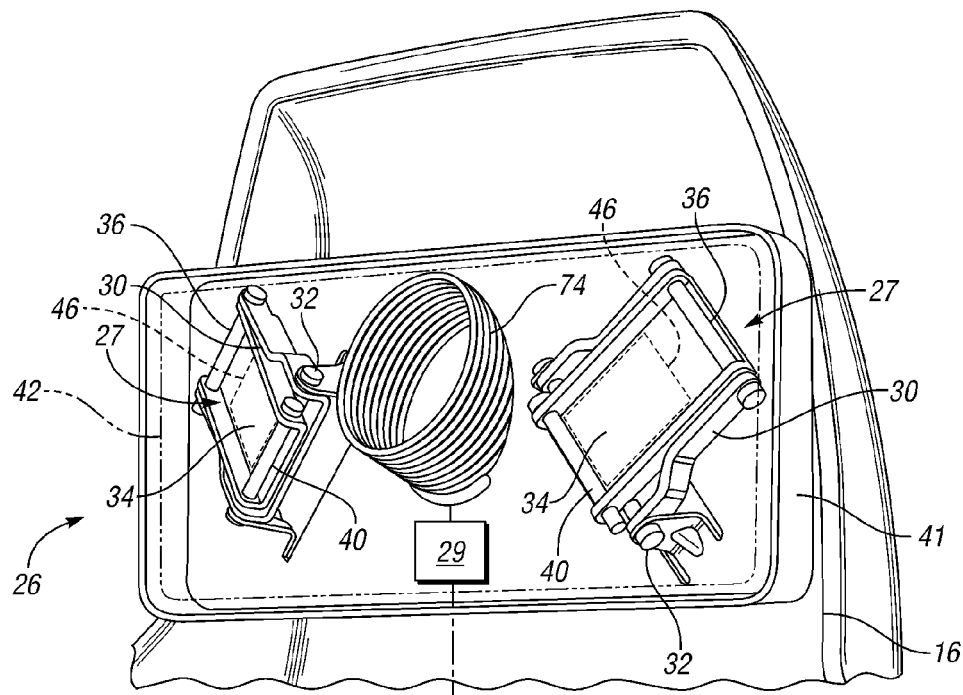
FIG. 5 is a perspective view of another embodiment of a seat back.
Figure 6A:
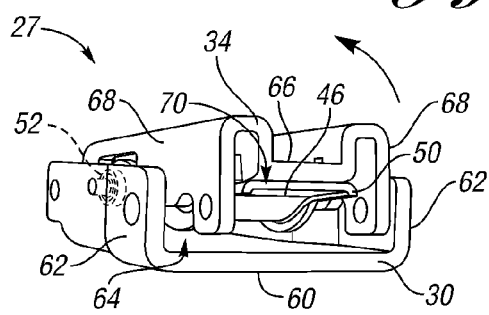
FIG. 6a is a perspective view of an embodiment of a locking linkage in a design position of any one of the preceding Figures.
Figure 7A:
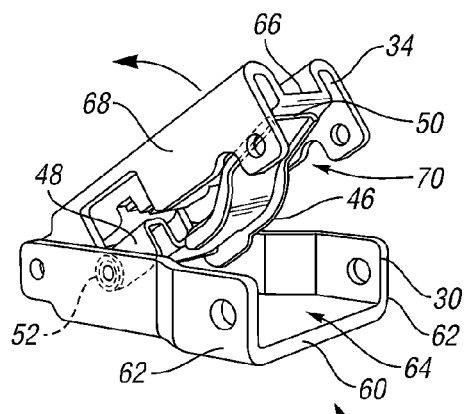
FIG. 7a is a perspective view of the locking linkage of FIG. 6a in an intermediate position.
Figure 6B:
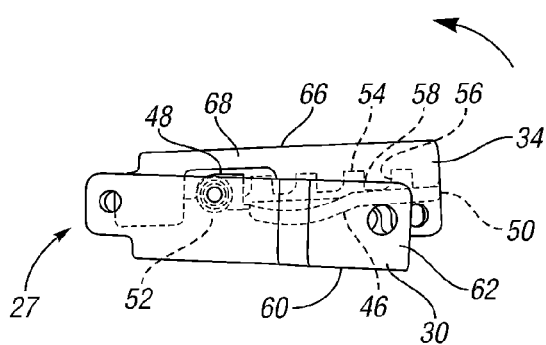
Figure 7B:
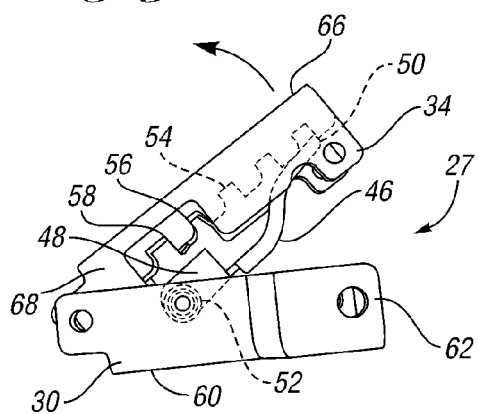
FIG. 7b is a side elevation view of the locking linkage of FIG. 7a in the intermediate position.

Referring now to FIG. 5, another active head restraint system 26 embodiment is illustrated. The locking linkage 27 is supported by the seat back 14 and includes a first link 30 pivotally mounted to the frame 16 with a first shaft 32. The first link 30 is pivotally mounted, at an end opposite the pivotal mounting to the frame 16, to a second link 34 with a second shaft 36. A locking member 46 is pivotally mounted on the first link 30 to translate along the second link 34 in one direction and lock with the second link 34 when no longer translating in the same direction. The second link 34 is pivotally mounted, at an end opposite the pivotal mounting to the first link 30, to a bracket 38 with a third shaft 40, as seen in FIGS. 3-4. The bracket 38 is mounted to the head restraint 42 at an end opposite the pivotal mounting to the second link 34. In one embodiment, the bracket 38 is mounted to the head restraint 42 by adhesive or a fastener. In another embodiment, the bracket 38 is insert molded on the head restraint 42. Any suitable mounting of the bracket 38 to the head restraint 42 is contemplated within the scope of the present invention.

The first link 30 pivots about the first shaft 32 and the second link 34 pivots about the second shaft 36 to extend the head restraint 42 toward the extended position while the locking member 46 translates along the second link 34. The locking member 46 locks the second link 34 relative to the first link 30 once the locking linkage 27 discontinues extension toward the extended position. The extension of the head restraint 42 toward the extended position may be any type of linear and/or nonlinear movement. Movement of the first link 30, the second link 34 and the locking member 46 is simultaneous. The bracket 38 is mounted to the head restraint 42 so that the head restraint 42 moves as the first and second links 30, 34 extend the head restraint 42 to the extended position illustrated. The collective distance traversed by the first link 30 and the second link 34 forces the head restraint 42 to the extended position and the locking member 46 locks the second link 34 relative to the first link 30 to lock the locking linkage 27 in the extended position or another intermediate position, as desired.

Any suitable shaft 32, 36, 40 which may be used for mounting and allows rotary motion is contemplated within the scope of the present invention. A non-limiting example of a shaft 32, 36, 40 is a fastener with a head oriented at one end of the fastener.

As shown in FIG. 5, the active head restraint system 26 has a stationary portion 41, which is supported by the frame 16. The active head restraint system 26 also may have a moveable head restraint 42. The stationary portion 41 may be connected to the moveable head restraint 42 by a pair of actuatable locking linkages 27. As illustrated, each locking linkage 27 has a first link 30 and a second link 34. The first link 30 and the second link 34 are pivotally connected with a shaft 36. The first link 30 is mounted to the stationary portion 41 by a shaft 32. The second link 34 is mounted to the moveable head restraint 42 and/or the cushioning 18 of FIG. 3, by a shaft 40.

The active head restraint system 26 is released from the design position, illustrated in FIG. 3, by an actuator 29. In one embodiment, the actuator 29 is a latch mechanism 29. Any known latch mechanism 29, including but not limited to a latch and striker, is contemplated within the scope of the present invention.

The actuator 29 retains the moveable head restraint 42 in the design position illustrated. Once the actuator 29 is activated, the moveable head restraint 42 is moved to the extended position, illustrated in FIG. 5, by a spring 74. In one embodiment, the spring 74 is a conical compression spring. In another embodiment, the spring 74 is a helical compression spring. Any suitable spring 74 is contemplated within the scope of the present invention. The locking linkages 27 guide the moveable head restraint 42 to the extended position.

As seen in FIGS. 6a-8b, the locking linkage 27 has a locking member 46 pivotally mounted on the first link 30 between the first link 30 and the second link 34. The locking member 46 allows the locking linkage 27 to pivot incrementally from the design position, illustrated in FIGS. 6a-6b, to an intermediate position, illustrated in FIGS. 7a-7b, to the extended position, illustrated in FIGS. 8a-8b. The arcuate arrows in FIGS. 6a-7b indicate the direction of travel the second link 34 relative to the first link 30 from the design position to the intermediate position and to the extended position. The multiple intermediate positions between the design position and the extended position are contemplated within the scope of the present invention.

In FIGS. 6a-8b, the locking member 46 is pivotally mounted to the first link 30 near a first end 48 of the locking member 46. At a second end 50, opposite the first end 48, the locking member 46 cooperates with the second link 34. In the design position, illustrated in FIGS. 6a-6b, the locking member 46 rests against the second link 34 and may not lock the second link 34 relative to the first link 30. In the intermediate position, illustrated in FIGS. 7a-7b and the extended position, illustrated in FIGS. 8a-8b, the second end 50 of the locking member 46 abuts the second link 34 so that when the locking linkage 27 is compressed to travel from the extended or intermediate positions toward the design position, the locking member 46 locks the second link 34 relative to the first link 30. Since the locking member 46 locks the locking linkage 27, the head restraint 42 can be locked at any contact position or the extended position, which allows the head restraint 42 to extend toward the head of the occupant, contact the head of the occupant at a contact position and lock at the contact position. The head restraint 42 is locked by the locking linkage 27 in the contact position, which can be any position between and including the design position and the extended position. In one embodiment, the locking linkage 27 extends until contact is made with the head of the occupant and is locked at this contact position. In another embodiment, the locking linkage 27 extends to the extended position and locks at the extended position.

Of course, it is contemplated within the scope of the present invention that the locking member 46 can be mounted to the link 34 to cooperate with the link 30 to lock the locking linkage 27.

As illustrated in the FIGS. 6a-8b, a spring 52 may be mounted at a pivotal axis between the first link 30 and the locking member 46. The spring 52 biases the locking member 46 toward the second link 34. As the locking linkage 27 moves from the design position to the extended position, the locking member 46 is biased to correspondingly translate along the second link 34.

The second link 34 of the linkage 27 has notches 54 formed therein. The notches 54 allow the locking member 46 to travel along the second link 34 as the locking linkage 27 moves from the design position towards the extended position. Once the locking linkage 27 discontinues travel towards the extended position, the locking member 46 locks against one of the notches 54 at a position corresponding to the extension of the second link 34 relative to the first link 30.

The notches 54 may have a sawtooth shape to allow incremental motion for the locking member 46 as the locking member 46 pivots when the locking linkage 27 extends from the design position towards the extended position. In one embodiment, the notches 54 have a leading edge 56 and an opposing locking edge 58. The leading edges 56 are provided at an upper edge of each notch 54 while the locking edges 58 are provided at a lower edge of each notch 54. The leading edge 56 is formed to allow the locking member 46 to lock with the second link 34 after the locking linkage 27 has traveled from the design position towards the extended position. The interaction between the locking member 46 and the locking edge 58 locks the second link 34 relative to the first link 30. The locking between the locking member 46 and the locking edge 58 prevents return travel of the second link 34 in the direction indicated by the arcuate arrows in FIGS. 8a-8b, and consequently the locking linkage 27 and head restraint 42 of FIGS. 1-4. Of course, any suitable shape for the notches 54 is contemplated within the scope of the present invention.

As depicted in FIGS. 6a-8b, the first link 30 of the locking linkage 27 has a base 60 and a pair of sidewalls 62 oriented on opposing sides of the base 60 forming a channel 64 therebetween. The locking member 46 is pivotally mounted to the sidewalls 62 by fasteners or other suitable pivotal mountings. In one embodiment, the first link 30 is pivotally mounted to the frame 22 proximate a first end of the sidewalls 62 and the second link 34 proximate a second end of the sidewalls 62, as seen in FIGS. 3-5. Of course, the first link 30 can be pivotally mounted to the frame 22 in any suitable manner.

The second link 34, as seen in FIGS. 6a-8b, has a base 66 and a pair of sidewalls 68 orientated on opposing sides of the base 66 forming a channel 70 therebetween. In the illustrated embodiment, the second link 34 is collapsible upon the first link 30 so that the locking member 46 is generally oriented within the first link channel 64 and the second link channel 70. The locking member 46 is concealed within the first link channel 64 and the second link channel 70 in the design position, as in FIGS. 6a-6b, to protect the locking member 46. Concealing the locking member 46 within the first link channel 64 and the second link channel 70 allows the locking linkage 27 to have a compact design. Additionally, the locking member 46 is protected within the first link channel 64 and the second link channel 70 as the second link 34 extends towards the extended position to reduce disturbances to the locking member 46. Furthermore, the locking linkage 27 reduces likelihood that the locking member 46 will unintentionally unlock from the notch 54 of the second link 34 because of deflection or varying tolerances. The locking linkage 27 has a compact design with few components as compared to the prior art.

Figures 8A, 8B:
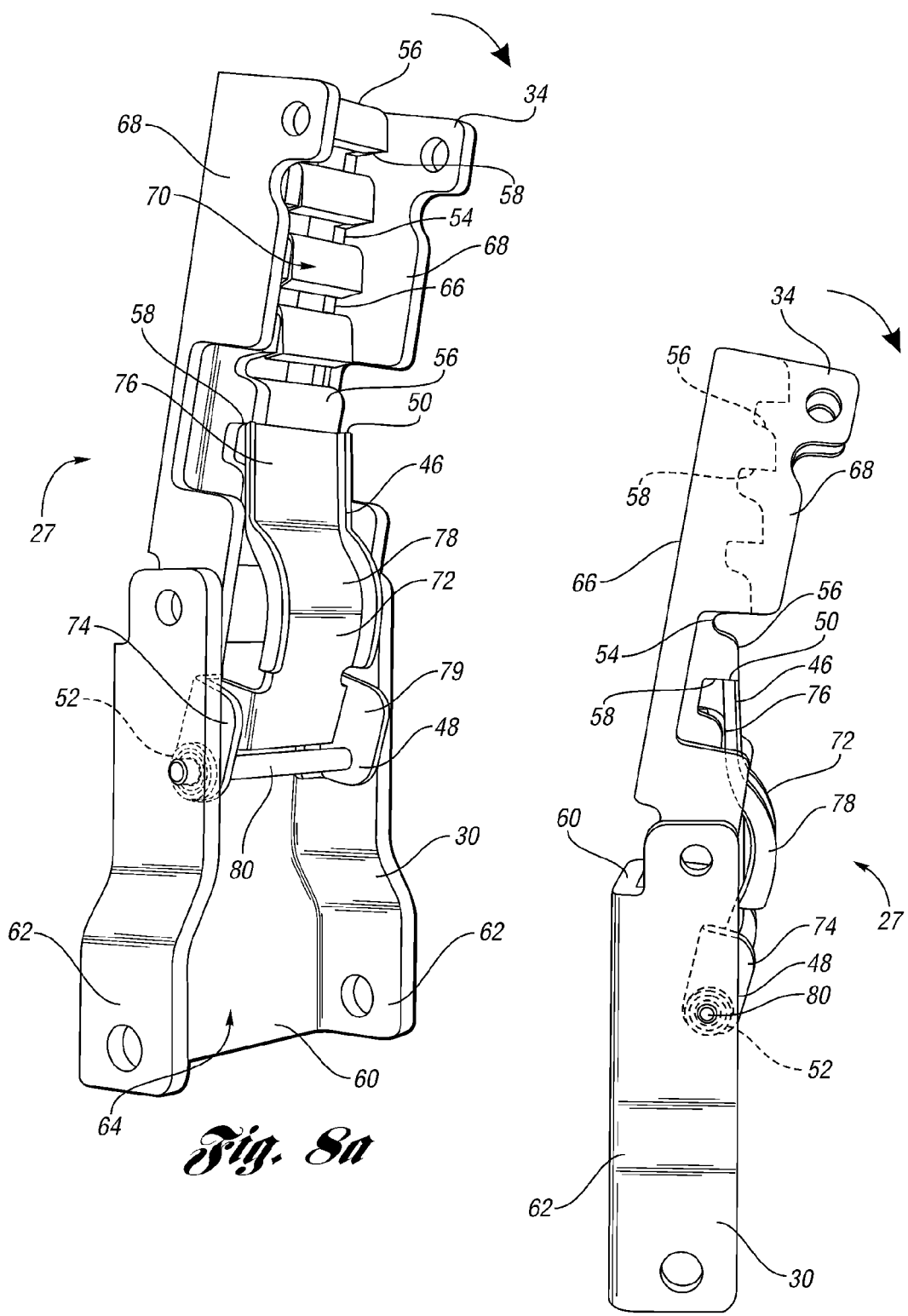
FIG. 8a is a perspective view of the locking linkage of FIG. 6a in an extended position.
FIG. 8b is a side elevation view of the locking linkage of FIG. 8a in the extended position.

In at least one embodiment and depicted in FIG. 8a, the locking member 46 has a base 72 and a pair of sidewalls 74 oriented proximate a first end of the base 72 and at opposing sides of the base 72 to provide structure for the locking member 46. The base 72 has a flat portion 76 and an arcuate portion 78. As illustrated, the flat portion 76 is connected to the arcuate portion 78 so that the flat portion 76 cooperates with the second link 34 while the arcuate portion 78 is connected to the sidewalls 74.

In one embodiment, the flat portion 76 moves over the second link 34 as the locking linkage 27 moves from the design position to the extended position. The arcuate potion 78 does not interfere with movement of the first link 30 or the second link 34, which decreases friction of the locking linkage 27. The locking member 46 is pivotally mounted to the first link 30 at the sidewalls 74 with shaft 80, as seen in FIGS. 8a-8b. Of course, any suitable pivotal mounting between the first link 30 and the locking member 46 is contemplated within the scope of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
   a frame providing structure for a seat back within a vehicle;
   an active head restraint system supported by the frame for moving to an extended position when the active head restraint system is activated, the active head restraint system having a linkage to lock in the extended position; and
   a head restraint oriented above the seat back of the frame, the head restraint being moveable relative to the frame by the active head restraint system to the extended position to provide support to the head of the occupant during an impact condition,
   wherein the linkage of the active head restraint system further comprises:
      a first link adapted to be pivotally connected to the frame;
      a second link pivotally connected to the first link and the head restraint; and
      a locking member pivotally connected to the first link and the second link to lock the second link relative to the first link,
   wherein the first link and the second link guide the head restraint to the extended position and the locking member and the second link collectively lock the head restraint in the extended position.

2. The vehicle seat of claim 1 wherein the second link of the active head restraint system further includes a plurality of locking notches provided therein to cooperate with the locking member to allow the locking member to pivot in a first direction and lock the locking member when the locking member discontinues motion in the first direction.

3. The vehicle seat of claim 2 wherein the locking notches generally each have a leading edge to allow the locking member to pivot in the first direction and a locking edge to abut against the locking member when the locking member discontinues motion in the first direction.

4. The vehicle seat of claim 2 wherein the base of the locking member further comprises:
   a flat portion to glide along the second link in the first direction and lock with the second link in the second direction; and
   an arcuate portion at one end of the flat portion to accommodate the pivotal connection between the first link and the second link while in the extended position.

5. The vehicle seat of claim 1 wherein the active head restraint system further comprises a biasing member provided between the locking member and the first link to bias the locking member toward the second link.

6. The vehicle seat of claim 1 wherein at least one of the first link and the second link of the linkage further comprises:
   a pair of sidewalls to form a channel therebetween such that the locking member is provided at least partially within the channel.

7. The vehicle seat of claim 1 wherein the locking member further comprises:
   a pair of side walls; and
   a base supporting the pair of side walls near a first end thereof, the base having a second end to cooperate with the second link.

8. The vehicle seat of claim 1 wherein the head restraint is lockable by the linkage at an intermediate extended position.

9. The vehicle seat of claim 8 wherein interaction between the second link and the locking member provides incremental locking so that the head restraint is lockable in a plurality of intermediate extended positions.

10. The vehicle seat of claim 1 further comprising a bracket adapted to pivotally connect the second link to the head restraint.

11. The vehicle seat of claim 1 wherein the second link is collapsible onto the first link such that the locking member is oriented therebetween.

12. The vehicle seat of claim 1 further comprising an actuator adapted to be connected to the frame and the head restraint to drive the linkage toward the extended position.

13. The vehicle seat of claim 12 further comprising a controller in operative connection with the actuator such that the controller sends a signal to the actuator so that the actuator moves the head restraint to the extended position.

14. A vehicle seat comprising:
   a frame providing structure for a seat back and adapted to be mounted within a vehicle;
   an active head restraint system supported by the frame for moving to an extended position when the active head restraint system is activated, the active head restraint system having a first linkage and a second linkage adapted to lock the active head restraint in the extended position; and
   a head restraint adapted to be supported by the frame, the head restraint being moveable relative to the frame to the extended position by the active head restraint system to provide support to the head of the occupant during an impact condition wherein the first and second linkages are mounted to the frame at an angle relative to each other so that the first and second linkages are not parallel in order to provide stability for the active head restraint system,
   wherein at least one of the first and second linkages further comprises:
      a first link adapted to be pivotally connected to a frame;
      a second link pivotally connected to the first link and connected to the head restraint, the second link having a plurality of locking notches provided therein; and
      a locking member pivotally connected to the first link and biased toward the second link to lock the second link relative to the first link, the locking member cooperating with the locking notches to lock at least one of the linkages in the extended position.

15. The vehicle seat of claim 14 wherein the locking notches each have a leading edge and a locking edge, the locking member cooperating with the locking notches so that the locking member is pivotal along the leading edges of the locking notches in a first direction as the head restraint is moved toward the extended position and locks with the locking edge of the locking member when the locking member discontinues motion in the first direction.

16. The vehicle seat of claim 14 wherein at least one of the first and second linkages further comprises:
   a pair of sidewalls forming a channel in at least one of the first and second linkages; and a locking member adapted to lock the active head restraint in the extended position such that the locking member is provided at least partially within the channel.

17. The vehicle seat of claim 16 wherein the locking member is pivotally connected to at least one of the first and second linkages.

18. A vehicle seat comprising:

a frame providing structure for a seat back within a vehicle;

an active head restraint system supported by the frame for moving to an extended position when the active head restraint system is activated, the active head restraint system having a linkage to lock in the extended position; and a head restraint oriented above the seat back of the frame, the head restraint being moveable relative to the frame by the active head restraint system to the extended position to provide support to the head of the occupant during an impact condition, wherein the linkage of the active head restraint system further comprises:

a first link adapted to be pivotally connected to the frame, the first link having a base adapted to be mounted to the frame; and a second link pivotally connected to the first link and adapted to be connected to the head restraint;

a locking member pivotally connected to the first link and biased toward the second link to lock the second link relative to the first link; and a pair of sidewalls provided at opposite sides of the base to form a channel therebetween such that the locking member is provided at least partially within the channel.

19. The vehicle seat of claim 18 wherein the second link of the linkage further comprises:

a base adapted to be mounted to the head restraint; and a pair of sidewalls provided at opposite sides of the base to form a channel therebetween such that the locking member is collectively provided within the channel of the first link and the channel of the second link.

* * * * *